United States Patent
Nishimura et al.

(10) Patent No.: US 8,117,981 B2
(45) Date of Patent: Feb. 21, 2012

(54) LIQUID MATERIAL SUPPLYING APPARATUS AND LIQUID MATERIAL SUPPLYING METHOD

(75) Inventors: Hironobu Nishimura, Tokorozawa (JP); Masahiro Nakamura, Saitama (JP)

(73) Assignee: Origin Electric Company, Limited, Tokyo (JP)

( * ) Notice: Subject to any disclaimer, the term of this patent is extended or adjusted under 35 U.S.C. 154(b) by 817 days.

(21) Appl. No.: 12/223,207

(22) PCT Filed: Jan. 25, 2007

(86) PCT No.: PCT/JP2007/051163
§ 371 (c)(1),
(2), (4) Date: Jul. 23, 2008

(87) PCT Pub. No.: WO2007/086459
PCT Pub. Date: Aug. 2, 2007

(65) Prior Publication Data
US 2010/0229726 A1     Sep. 16, 2010

(30) Foreign Application Priority Data

Jan. 25, 2006   (JP) ................................. 2006-016256

(51) Int. Cl.
*B05C 5/02* (2006.01)
(52) U.S. Cl. ............ 118/52; 118/319; 118/712; 96/175; 96/179; 222/189.06; 222/189.11; 222/23; 222/386
(58) Field of Classification Search .................... 118/52, 118/712, 320; 137/14, 154; 96/175, 179; 95/242; 222/189.06, 189.11, 23, 386
See application file for complete search history.

(56) References Cited

U.S. PATENT DOCUMENTS

| | | | | |
|---|---|---|---|---|
| 4,258,943 A | * | 3/1981 | Vogt et al. | 285/340 |
| 5,199,988 A | * | 4/1993 | Kamezaki et al. | 118/52 |
| 6,029,479 A | * | 2/2000 | Pattee | 68/18 F |
| 6,280,291 B1 | * | 8/2001 | Gromko et al. | 451/8 |

(Continued)

FOREIGN PATENT DOCUMENTS

JP    64-007918    1/1989

(Continued)

OTHER PUBLICATIONS

International Search Report of PCT/JP2007/051163 dated Mar. 20, 2007.

(Continued)

*Primary Examiner* — Laura Edwards
(74) *Attorney, Agent, or Firm* — Kenyon & Kenyon LLP.

(57) ABSTRACT

In order to apply a liquid material including a small number of bubbles, in particular almost no bubbles larger than a predetermined size, a liquid material supplying apparatus includes: a pressure tank applying a positive pressure higher than the atmospheric pressure to the liquid material; a syringe having a nozzle for discharging the liquid material; and a liquid path member forming a liquid path leading the liquid material from the pressure tank to the syringe; a valve member which is provided on the liquid path member and which opens/closes the liquid path; a bubble defoaming filter which is provided on the liquid path member between the syringe and the valve member and which removes bubbles from the liquid material lead in the liquid path member; and a pressure applying mechanism which starts/stops discharging the liquid material from the nozzle by selectively applying a first pressure higher than the atmospheric pressure and a second pressure lower than the first pressure.

12 Claims, 6 Drawing Sheets

U.S. PATENT DOCUMENTS

| | | | |
|---|---|---|---|
| 6,402,821 B1 * | 6/2002 | Matsuyama | 96/175 |
| 6,444,029 B1 * | 9/2002 | Kimura et al. | 118/52 |
| 2002/0092559 A1 * | 7/2002 | Ueda | 137/14 |
| 2005/0095723 A1 * | 5/2005 | DiTrolio et al. | 436/180 |

FOREIGN PATENT DOCUMENTS

| | | |
|---|---|---|
| JP | 02-027903 | 7/1990 |
| JP | 04-115520 | 4/1992 |
| JP | 04-190873 | 7/1992 |
| JP | 05-200203 | 8/1993 |
| JP | 08-0335770 | 12/1996 |
| JP | 09-136052 | 5/1997 |
| JP | 10-272409 | 10/1998 |
| JP | 11-090293 | 4/1999 |
| JP | 11-156267 | 6/1999 |
| JP | 11-290745 | 10/1999 |
| JP | 2000-263514 | 9/2000 |
| JP | 2001-067740 | 3/2001 |
| JP | 2001-155985 | 6/2001 |
| JP | 2001-347210 | 12/2001 |
| JP | 2002-175648 | 6/2002 |
| JP | 2004-275859 | 10/2004 |

OTHER PUBLICATIONS

The references cited herein were cited in an Japanese Office Action of May 31, 2011 issued in corresponding Japanese Application No. 2006-016256.

* cited by examiner

LIQUID MATERIAL SUPPLYING APPARATUS AND LIQUID MATERIAL SUPPLYING METHOD

TECHNICAL FIELD

The present invention relates to a liquid material supplying apparatus and a liquid material supplying method for supplying liquid material such as an adhesive and a soldering paste to a member such as an optical disc substrate, a printed board and a semiconductor substrate on which the liquid material is supplied.

This application is a 371 of PCT/JP2007/051163, filed on Jan. 25, 2007.

Priority is claimed on Japanese Patent Application No. 2006-016256, filed Jan. 25, 2006, the content of which is incorporated herein by reference.

BACKGROUND ART

Various methods and apparatuses have been proposed and, by using these methods and apparatuses, various liquid materials including: a liquid adhesive for adhering a pair of optical disc substrates; a liquid resin for forming a resin layer which protects a surface of a disc substrate; a photoresist material or a soldering paste used during a production step of electric parts; and the like, are supplied to an object member. For example, there have been demands with regard to optical discs, in particular, an adhering step of a pair of disc substrates by using an adhesive included in production steps of DVD (digital versatile disc), a liquid resin supplying step for forming an covering layer which transmits light included in production steps of a next generation optical disc called a blu-ray disc, and a step of adhering a pair of disc substrates via a much thinner adhesive layer than an adhesive layer of the above-described DVD included in production steps of a next generation optical disc called HD-DVD (high definition-digital versatile disc).

With regard to such optical discs, it is not possible to accurately read data recorded on the optical disc if large bubbles are included in the adhesive layer or the resin layer, hence, a liquid resin supplying step has included a defoaming step for removing bubbles from the liquid resin. With regard to existing DVDs, comparatively large bubbles are acceptable, and liquid material supplying methods and apparatuses which are currently proposed can be applied to production steps of the optical discs. However, the next generation optical discs have a strict limitation for the size of such bubbles included in the adhesive layer, the resin layer, and the like. For example, existing DVDs have a limitation of 100 μm on the diameter of bubbles included in the adhesive layer and the resin layer, but the next generation optical disc requires a much smaller diameter with regard to the included bubbles. In addition, there is a possibility in which the viscosity of a liquid resin used for forming the adhesive layer or the resin layer of the next generation optical disc is severalfold higher than the DVD, and it is very difficult to defoam bubbles so as to achieve the limitation by using the existing liquid material supplying methods and apparatuses (for example, see Patent Document 1 and 2) that are used for producing DVDs, hence, it is not possible to apply these to the production of next generation optical discs.

The inventors of the present invention have conducted various experiments based on an idea in which, in order to reduce the size of bubbles included in the adhesive layer and the resin layer of the next generation optical disc, it is necessary to reduce the size of bubbles included in the liquid material before being supplied to a objective member. As a result, one main reason it was difficult to reduce the size of bubbles included in the liquid material was found, that is, in the conventional liquid material supplying apparatuses and methods, as described in Patent Document 1, in which a mechanical operation of opening/closing the liquid material is conducted at a stage which is comparatively close to a discharging step of the liquid material on the objective member. This point is explained below in detail. For example, as described in Patent Document 1, in a case in which a supplying/stopping operation of the liquid material is conducted by opening/closing a liquid path with, for example, a valve member, the valve member conducts an opening/closing operation in the liquid material, the liquid material is mechanically rolled or ruffled by the valve member, and new bubbles and large bubbles are generated by gathering small bubbles included in the liquid material. In particular, an adhesive and/or a liquid resin with a higher viscosity than existing DVDs are applied to the next generation optical discs, and it is difficult to form a film without including bubbles if the liquid material with such a high viscosity is used.

In addition, not only in a discharging system disclosed in Patent Document 2, but in all discharging systems, it was found that bubbles were easily generated at each step of the discharging system. For example, in Patent Document 2, bubbles included in the adhesive are removed in a warming tank. However, on a liquid path which supplies the adhesive from which bubbles are removed to an adhesive discharging head, there are multiple pipe members, pumps, temperature control tanks, and the like which are provided, and finally the adhesive is discharged from the adhesive discharging head. In addition, in the same manner as Patent Document 1, the adhesive discharging head mechanically discharges/stops the liquid material. However, it was found that, in the liquid material including the adhesive supplied through the liquid path, bubbles are included or generated, for example, by a seam of pipes, or a small bump or concave portion of the pipe or when the liquid material is lead inside a tank from the pipe, is lead to the pipe member out of various tanks, is lead into or out of the pump or is lead into the adhesive discharging head from the pipe. Therefore, in order to reduce bubbles included in the discharged adhesive as much as possible, it is necessary to avoid generating bubbles and to pay attention to reduce the size of bubbles at each step of the discharging system of the liquid material.

[Patent Document 1] Japanese Patent Application, First Publication No. 2004-275859
[Patent Document 2] Japanese Patent Application, First Publication No, 2001-067740

DISCLOSURE OF INVENTION

In the present invention, in order to solve the above-described problem, a defoaming operation is conducted at a stage close to a syringe which is a discharging head of a liquid material, the liquid material is supplied into the syringe just after removing bubbles, a discharging operation of the liquid material is controlled by adjusting a pressure without using a mechanical valve, and it is possible to supply the liquid material including small amount of bubbles. In addition, in the present invention, in order to reduce the size of bubbles, there are various improvements with regard to the constitution of a defoaming filter for removing bubbles, a liquid path of the liquid material after deforming bubbles, a constitution of the syringe, a liquid material discharging nozzle, and a step of discharging the liquid material.

A first aspect of the present invention is a liquid material supplying apparatus including: a pressure tank applying a positive pressure higher than the atmospheric pressure with respect to a liquid material; a syringe including a nozzle for discharging the liquid material; a valve member which is provided between the pressure tank and the syringe and which opens/closes a liquid path of the liquid material; a bubble defoaming filter which is provided between the syringe and the valve member and which removes bubbles from the liquid material; and a pressure applying mechanism which selectively applies a positive pressure higher than the atmospheric pressure and a negative pressure lower than the atmospheric pressure inside the syringe in order to start/stop discharging the liquid material from the nozzle.

In accordance with the first aspect of the present invention, it is possible to provide a liquid material supplying apparatus which supplies the liquid material to the objective member without including bubbles larger than a predetermined size and with a small number of bubbles.

A second aspect of the present invention is the above-described liquid material supplying apparatus, further including: a liquid surface detecting sensor which detects a liquid surface of the liquid material inside the syringe and outputs a first detection signal; and a first controller which inputs the first detection signal and which opens the valve member if it is detected that the liquid material inside syringe is lower than a predetermined level.

In accordance with the second aspect of the present invention, it is possible to automatically start/stop the supply of the liquid material into the syringe without any harmful effects, and it is possible to maintain the level of the liquid material in the syringe so as to be always at a predetermined level.

A third aspect of the present invention is the above-described liquid material supplying apparatus, further including: a sensor which outputs a second detection signal if the second sensor detects an objective member to which the liquid material is applied, wherein when the first controller inputs the second signal, the first controller outputs a request signal to the pressure applying mechanism for applying the positive pressure, and the pressure applying portion applies the positive pressure inside the syringe when the pressure applying portion inputs the request signal.

In accordance with the third aspect of the present invention, it is possible to automatically supply the liquid material on the objective member when the objective member is mounted at a predetermined position.

A fourth aspect of the present invention is the above-described liquid material supplying apparatus, further including an outlet aperture which is provided at a position lower than the predetermined level inside the syringe and from which the liquid material supplied from the pressure tank via the valve member is lead into the syringe.

In accordance with the fourth aspect of the present invention, it is possible to supply the liquid material including a comparatively small number of bubbles because it is possible to avoid bubbles when the liquid material is supplied into the syringe.

A fifth aspect of the present invention is the above-described liquid material supplying apparatus, wherein the outlet aperture is arranged close to a sidewall of the syringe.

In accordance with the fifth aspect of the present invention, it is possible to avoid involving bubbles and supply the liquid material including a comparatively small number of bubbles on the objective member because the liquid material is quietly lead into the syringe along the wall when the liquid material is supplied into the syringe.

A sixth aspect of the present invention is the above-described liquid material supplying apparatus, further including: a pressure applying end portion which is arranged inside the syringe and from which a gas with a pressure is discharged when the pressure applying mechanism applies the positive pressure; and a small aperture which is provided at the pressure applying end portion and which faces in a substantially parallel direction or in an obliquely upward direction compared to a surface of the liquid material.

In accordance with the sixth aspect of the present invention, a surface of the liquid material inside the syringe is not disturbed because of a rapid change of a pressure when a positive pressure is applied inside the syringe, hence, it is possible to avoid involving bubbles and supply the liquid material including comparatively small amount of bubbles on the objective member.

A seventh aspect of the present invention is the above-described liquid material supplying apparatus, further including: a pipe member which is flexible, has an end that is connected to the nozzle, and has the same diameter as the nozzle; and another nozzle which has an end connected to another end of the pipe member and has the same diameter as the nozzle.

In accordance with the seventh aspect of the present invention, it is possible to discharge the liquid material at a desired position, it is possible to obtain a large amount of flexibility or degree-of-freedom for constituting the apparatus, and consequently, it is possible to provide a usable apparatus. In addition, it is possible to supply the liquid material including a comparatively small number of bubbles because it is possible to reduce bubbles in the liquid material included at a portion between the pipe member and another nozzle.

An eighth aspect of the present invention is the above-described liquid material supplying apparatus, further including a terminal surface of the nozzle which has an outside diameter smaller than other portions of the terminal surface.

In accordance with the eighth aspect of the present invention, it is possible to reduce the size of the liquid material formed at a top of the above-described other nozzle, and it is possible to reduce the size of an area that touches the substrate, hence, it is possible to control the number of included bubbles. In addition, it is possible to reduce the amount of bubbles included in the liquid material at the top of the other nozzle, and it is possible to improve the uniformity of the discharged liquid material.

A ninth aspect of the present invention is the above-described liquid material supplying apparatus, further including a terminal surface of the other nozzle which has an outside diameter smaller than other portions of the another terminal surface.

In accordance with the ninth aspect of the present invention, it is possible to reduce the size of the liquid material formed at a top of the nozzle, and it is possible to reduce the size of an area that touches the substrate, hence, it is possible to control the number of included bubbles. In addition, it is possible to reduce the amount of bubbles in the liquid material included at the top of the nozzle, and it is possible to improve the uniformity of the discharged liquid material.

A tenth aspect of the present invention is the above-described liquid material supplying apparatus, further including a liquid material gathering pipe which gathers the liquid material and which is provided above the bubble defoaming filter.

In accordance with the tenth aspect of the present invention, it is possible to reuse the liquid material while efficiently gathering the liquid material which includes a large number of bubbles.

An eleventh aspect of the present invention is the above-described liquid material supplying apparatus, further including at least one mesh board which is the bubble defoaming filter and which comprises a small hole.

In accordance with the eleventh aspect of the present invention, it is possible to reliably remove the bubbles for a long time even if the liquid material has a large viscosity and/or flows comparatively at a high speed.

A twelfth aspect of the present invention is the above-described liquid material supplying apparatus, wherein at least two of the mesh boards are provided, and the diameter of the small holes on the mesh board provided on a side close to a upstream of the liquid material is larger than the diameter of the small holes on the mesh board on a side close to a downstream of the liquid material.

In accordance with the twelfth aspect of the present invention, it is possible to reliably remove the bubbles for a long time even if the liquid material has a large viscosity and/or flows at a comparatively high speed.

A thirteenth aspect of the present invention is the above-described liquid material supplying, wherein the pressure applying mechanism includes: a first negative pressure portion applying a first negative pressure to the syringe; a second negative pressure portion applying a second negative pressure smaller than the first negative pressure to the syringe; and a second controller which controls the first negative pressure portion to apply the first negative pressure when stopping the discharge of the liquid material, and after a predetermined time, controls both the first negative pressure portion to stop applying the first negative pressure and the second negative pressure portion to apply the second negative pressure.

In accordance with the thirteenth aspect of the present invention, in addition to an advantage in which it is possible to provide a liquid material supplying apparatus which supplies the liquid material to the objective member without including bubbles larger than a predetermined size and with a small number of bubbles, it is possible to reduce the number of bubbles in the liquid material included at the top of the discharging nozzle, and it is possible to improve the uniformity of the discharged liquid material.

A fourteenth aspect of the present invention is an optical disc producing apparatus including the above-described liquid material supplying apparatus.

In accordance with the fourteenth aspect of the present invention, by reducing the amount of bubbles included in such as the adhesive as small as possible, it is possible to provide an optical disc production apparatus which can produce optical discs with high quality.

In addition to the above description, the present application includes following inventions for solving the aforementioned problems.

The present invention provides a liquid material supplying apparatus characterized by including: a pressure tank which applies a positive pressure higher than the atmospheric pressure with respect to the liquid material; a syringe including a nozzle which discharges the liquid material; a liquid path member forming a liquid path through which the liquid material is lead from the pressure tank to the syringe; a valve member which is provided on the liquid path member and which opens/closes the liquid path; a bubble defoaming filter which is provided on the liquid path member between the syringe and the valve member and which removes bubbles from the liquid material lead inside the liquid path member; and a pressure applying mechanism starting/stopping supplying the liquid material from the nozzle by selectively applying a positive pressure higher than the atmospheric pressure or a negative pressure lower than the atmospheric pressure inside the syringe.

The present invention is the above-described invention and provides a liquid material supplying apparatus characterized by including: a liquid level detecting sensor which detects a liquid level of the liquid material inside the syringe; and a controller for controlling an open/close operation of the valve member so as to maintain the liquid material inside the syringe at a predetermined level or higher based on a detection signal output from the liquid level detecting sensor.

The present invention is the above-described invention and provides a liquid material supplying apparatus characterized by including an objective member detection sensor detecting whether or not the objective member to which the liquid material is supplied from the syringe exists, wherein the controller activates the pressure applying mechanism when receiving the detection signal from the objective member detecting sensor, and the pressure applying mechanism applies the positive pressure inside the syringe.

The present invention is the above-described invention and provides a liquid material supplying apparatus characterized in that the liquid path member has a liquid outlet at an end from which the liquid material is supplied into the syringe, the liquid outlet is provided at a lower position than the predetermined level inside the syringe, and the liquid outlet is always set under the level of the liquid material.

The present invention is the above-described invention and provides a liquid material supplying apparatus characterized in that the liquid outlet at the end of the liquid path member is arranged close to a surface of a sidewall of the syringe, and the liquid material is supplied along the sidewall of the syringe.

The present invention is the above-described invention and provides a liquid material supplying apparatus characterized in that the pressure applying mechanism includes a pressure applying terminal portion from which the pressure is applied inside the syringe, and the pressure applying terminal portion has a small aperture provided in parallel with or in an obliquely upward direction compared to the surface of the liquid material.

The present invention is the above-described invention and provides a liquid material supplying apparatus characterized in that an end of a flexible pipe member is connected to the nozzle of the syringe, a second nozzle is connected to another end of the flexible pipe member, and inside diameters of both the flexible pipe member and the second nozzle are the same as a inside diameter of the nozzle of the syringe.

The present invention is the above-described invention and provides a liquid material supplying apparatus characterized in that an outside diameter of an end of the nozzle or the second nozzle is smaller than an outside diameter of another end of the nozzle or the second nozzle.

The present invention is the above-described invention and provides a liquid material supplying apparatus characterized by providing a liquid material recycling pipe at an upper portion of the bubble defoaming filter and gathering the liquid material.

The present invention is the above-described invention and provides a liquid material supplying apparatus characterized in that the bubble defoaming filter is constituted from multiple mesh boards arranged in parallel at a certain interval, and the mesh boards have multiple apertures of a very small diameter.

The present invention is the above-described invention and provides a liquid material supplying apparatus characterized in that the small apertures of the mesh board of the bubble defoaming filter arranged at a side of a liquid entrance of the bubble defoaming filter has a larger diameter compared to a liquid outlet of the bubble defoaming filter.

The present invention is the above-described invention and provides a liquid material supplying apparatus characterized in that the nozzle and/or the second nozzle are made from metallic material, and an electric field is formed between the nozzle and/or the second nozzle and the objective member.

The present invention is a liquid material supplying method characterized by comprising: a first step of opening/closing a liquid path which supplies the liquid material; a second step of removing bubbles included in the liquid material supplied through the liquid path; a third step of supplying the liquid material into a syringe after removing the bubbles; a fourth step of supplying the liquid material from the syringe onto the objective material by applying a positive pressure inside the syringe higher than the atmospheric pressure; and a fifth step of stopping the supply of the liquid material by applying a negative pressure inside the syringe lower than the atmospheric pressure.

The present invention is the above-described invention providing a liquid material supplying method characterized in that an opening/closing operation of the liquid material is conducted based on a level of a surface of the liquid material or conducted every predetermined interval.

The present invention is the above-described invention providing a liquid material supplying method characterized by further including: a first step of supplying the liquid material after removing bubbles; a second step of applying a positive pressure higher than an atmospheric pressure in the syringe in order to supply the liquid material from the syringe onto the objective member; and a third step of applying a negative pressure lower than the atmospheric pressure inside the syringe and after a predetermined time, switching to a second negative pressure higher than the first negative pressure and lower than the positive pressure in order to stop supplying the liquid material.

The present invention is the above-described invention providing a liquid material supplying method characterized in that, when the objective material is detected, the positive pressure is applied inside the syringe in accordance with a predetermined sequence of operations, and consequently, the liquid material is supplied from the syringe onto the objective material.

In accordance with the above-described invention, it is possible to provide a liquid material supplying apparatus which can supply the liquid material without including bubbles larger than a predetermined size and can supply the liquid material including a small number of bubbles to the objective material.

In accordance with the above-described invention, it is possible to automatically start/stop supplying the liquid material into the syringe without causing harmful influence on the liquid material inside the syringe, and it is possible to maintain a level of the liquid material so as to always be a predetermined level or higher.

In accordance with the above-described invention, when the objective material is mounted on a predetermined position, it is possible to automatically supply the liquid material onto the objective material.

In accordance with the above-described invention, it is possible to avoid including bubbles when the liquid material is supplied into the syringe, and consequently, it is possible to supply the liquid material including a comparatively small number of bubbles.

In accordance with the above-described invention, the liquid material is quietly lead into the syringe along a surface of the wall of the syringe when the liquid material is supplied into the syringe, hence, it is possible to avoid involving bubbles and supply the liquid material including a comparatively small number of bubbles to the objective material.

In accordance with the above-described invention, the surface of the liquid material is not disturbed because of rapid changes of the pressure when the positive pressure is applied into the syringe, hence, it is possible to avoid involving bubbles and supply the liquid material including comparatively small number of bubbles to the objective material.

In accordance with the above-described invention, it is possible to discharge the liquid material at a desired position, it is possible to obtain a large amount of flexibility or degree-of-freedom for constituting the apparatus, and consequently, it is possible to provide a usable apparatus. In addition, it is possible to supply the liquid material including a comparatively small number of bubbles because it is possible to reduce bubbles in the liquid material included at a portion between the pipe member and the second nozzle.

In accordance with the above-described invention, it is possible to reduce the size of the liquid material formed at a top of the nozzle, and it is possible to reduce the size of an area that touches the substrate, hence, it is possible to control the amount of included bubbles. In addition, it is possible to reduce the number of bubbles in the liquid material included at the top of the nozzle, and it is possible to improve the uniformity of the discharged liquid material.

In accordance with the above-described invention, it is possible to efficiently gather the liquid material which includes a large number of bubbles, hence, it is possible to reuse the liquid material, and in addition, it is possible to remove bubbles included in the liquid material.

In accordance with the above-described invention, it is possible to reliably remove the bubbles for a long time even if the liquid material has a large viscosity and/or flows at a comparatively high speed.

In accordance with the above-described invention, it is possible to increase the amount of the liquid material on which a defoaming operation is conducted, and it is possible to effectively remove the bubbles, hence, it is possible to apply a small bubble defoaming filter.

In accordance with the above-described invention, it is possible to reduce bubbles of the liquid material included when the liquid material is discharged from the discharging nozzle onto the objective material.

In accordance with the above-described invention, it is possible to provide a liquid material supplying method which can supply the liquid material without including bubbles larger than a predetermined size and can supply the liquid material including a small number of bubbles to the objective material.

In accordance with the above-described invention, it is possible to provide a liquid material supplying method which can automatically start/stop supplying the liquid material into the syringe without causing harmful influence on the liquid material inside the syringe, and it is possible to maintain a level of the liquid material so as to always be a predetermined level or higher.

In accordance with the above-described invention, in addition to an advantage in which it is possible to provide a liquid material supplying apparatus which supplies the liquid material to the objective member without including bubbles larger than a predetermined size and with a small number of bubbles, it is possible to reduce the number of bubbles in the liquid material included at the top of the discharging nozzle, and it is possible to improve a uniformity of the discharged liquid material.

In accordance with the above-described invention, when the objective material is mounted at a predetermined position, it is possible to automatically supply the liquid material onto the objective material.

DESCRIPTION OF THE REFERENCE SYMBOLS

1 . . . storage tank
2A-2E . . . pipes
2X . . . bubble gathering pipe
3 . . . pump
4 . . . filter
5 . . . pressure tank
6 . . . valve member
7 . . . bubble defoaming filter
7A . . . case of bubble defoaming filter
7B liquid entrance of bubble defoaming filter
7C1-7Cn . . . mesh boards of bubble defoaming filter
7D . . . spacer of bubble defoaming filter
7E . . . outlet of bubble defoaming filter
8 . . . syringe
8A . . . pipe member of syringe
8B . . . nozzle of syringe
8C . . . roof portion of syringe
9 . . . liquid surface level detecting sensor
9A . . . detecting device of liquid surface level detecting sensor
9B . . . wiring of liquid surface level detecting sensor
10 controller
11 . . . wiring
12 . . . air pipe
12A . . . pressure applying terminal portion of air pipe
13 . . . switching valve member
13A . . . positive pressure switching valve member
13B . . . negative pressure switching valve member
13B1 . . . first negative pressure switching valve member
13B2 . . . second negative pressure switching valve member
14 . . . pressure apparatus
15 . . . flexible pipe member
16 . . . discharging nozzle
17 . . . spinning apparatus
18 . . . rotating head
19 . . . objective member detecting sensor
20 . . . wiring
S . . . liquid material
SP . . . liquid material in sphere shape
D . . . disc substrate

BEST MODE FOR CARRYING OUT THE INVENTION

Embodiment 1

Figure 1:
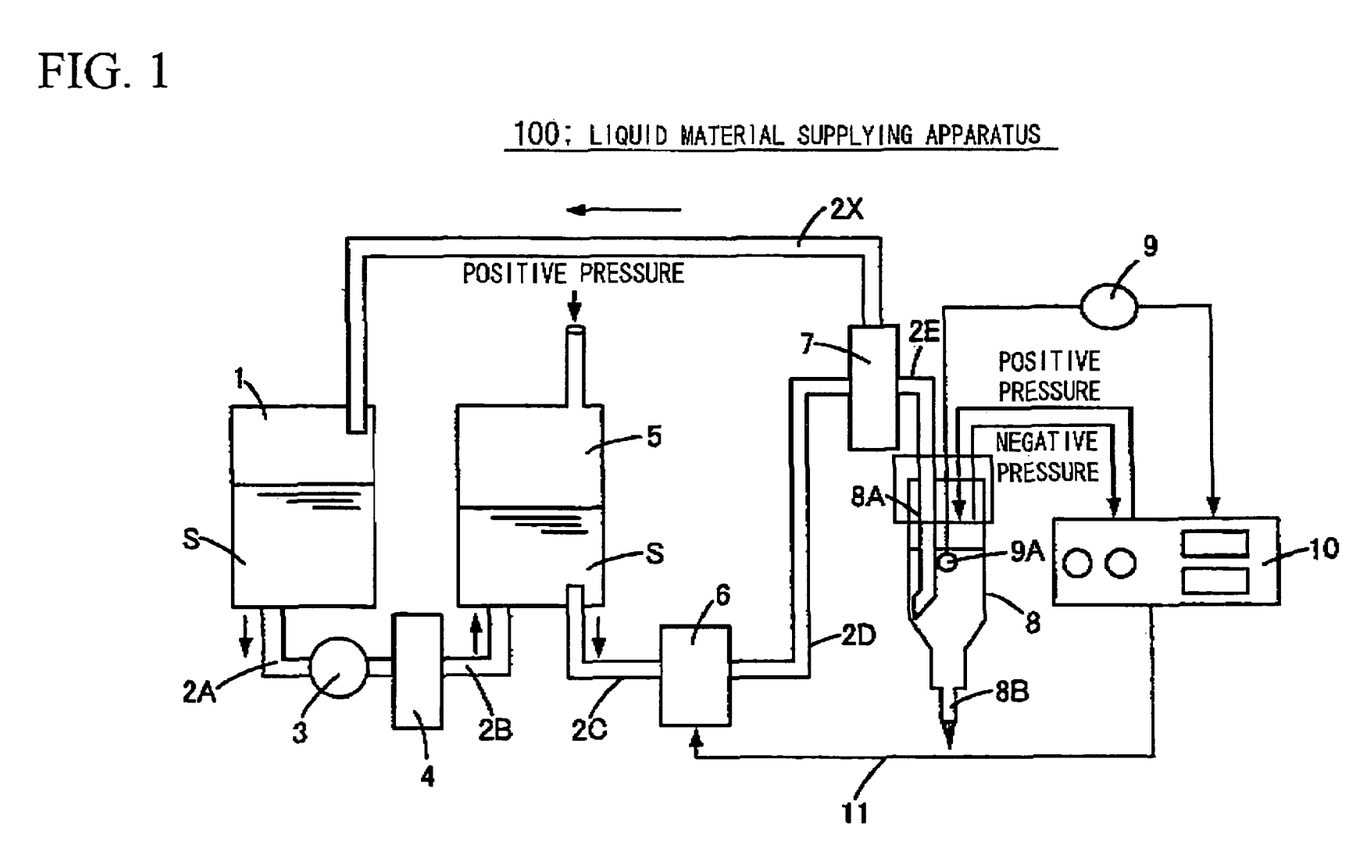
FIG. 1 is a drawing which shows a liquid material supplying apparatus 100 of an embodiment 1 of the present invention.
Figure 2:
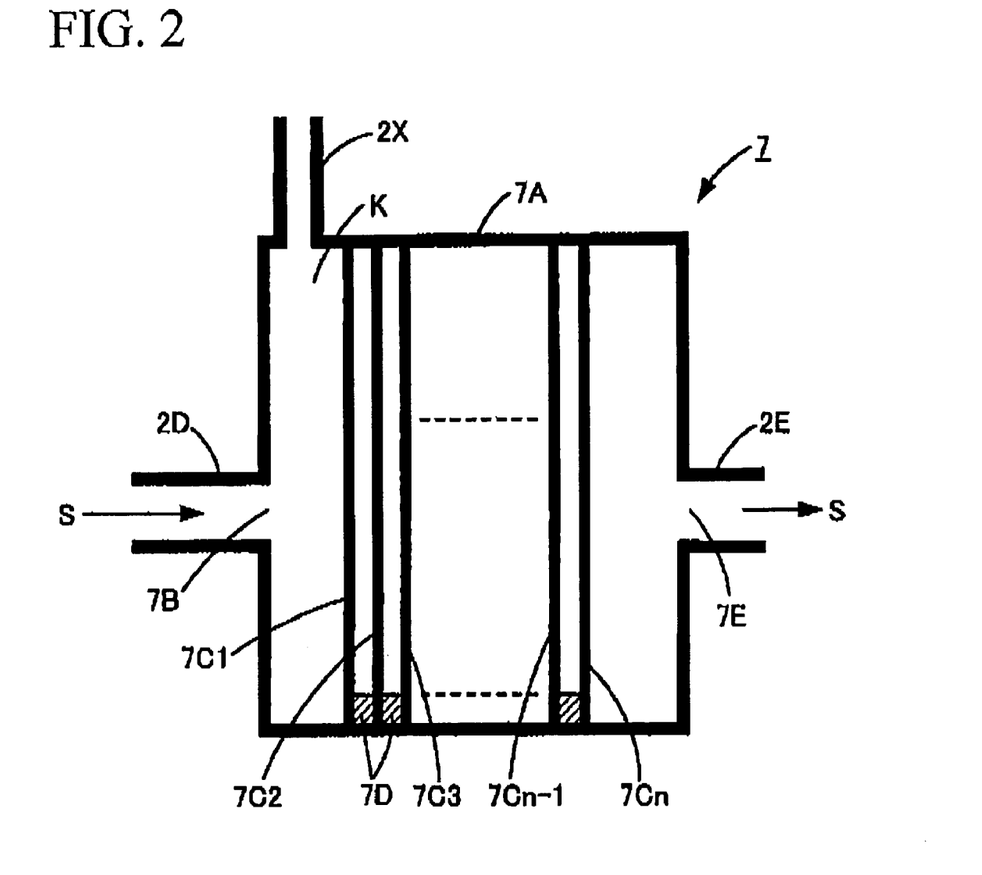
FIG. 2 is a drawing showing an example of a bubble defoaming filter which is preferable for the liquid material supplying apparatus 100 of the present invention.

In reference to FIGS. 1 and 2, a first liquid material supplying apparatus 100 of an embodiment 1 of the present invention is explained. In FIG. 1, a storage tank 1 stores a liquid material S on which a normal defoaming operation has been conducted, The liquid material S is a resin for forming a transparent film with an excellent light transmission property and an excellent mar-proof property, a soldering paste, and the like. In a practical case, with regard to the liquid material S, even after conducting the normal defoaming operation, it is not possible to remove small bubbles, and the liquid material S includes large number of small bubbles. The liquid material S is transported to a filter 4 by a pump 3 which is provided on a pipe 2A connected to the storage tank 1. The filter 4 is a generally used filter and removes unnecessary objects such as dust. After removing unnecessary objects, the liquid material S is transported to a pressure tank 5 via a pipe 2B. A compressed gas supplying mechanism which is not shown in the drawings applies a predetermined positive pressure larger than a normal atmospheric pressure onto a surface of the liquid material S inside the pressure tank 5, and due to the applied pressure, the pressure tank 5 supplies the liquid material to a syringe described below.

A valve member 6 such as an electromagnetic valve provided on the pipe 2C which is connected to the pressure tank 5 stops transmitting the liquid material S by opening/closing a liquid path inside the pipe 2C based on electric signals, and starts transmitting the liquid material S by opening a liquid path inside the pipe 2D. After this, the liquid material S is transported to a bubble defoaming filter 7 via the pipe 2D. In a process from the storage tank 1 to the bubble defoaming filter 7, there are various improvements such as applying the same inside diameter to the pipes 2A-2D so as to have as few and small seams as possible in order to avoid involving bubbles in the liquid material S, and consequently, less bubbles are included compared to conventional cases. However, bubbles are included in each step, and/or large bubbles are generated by gathering small bubbles, hence, the liquid material S includes from very small to large bubbles. Therefore, it is known that, if the liquid material S in such a state is discharged on the objective material in order to form a film of a predetermined thickness, the film includes large bubbles larger than a predetermined size, hence, if the liquid material S inside the pipe 2D is discharged, it is not possible to form a film that meets requirements. Due to such a problem, in the liquid material supplying apparatus of the embodiment 1, after the valve member 6 which mechanically opens/closes the liquid material S inside the liquid path a bubble defoaming filter 7 is connected to the pipe 2D, and the liquid material S is supplied to the syringe 8 via a short pipe 2E after removing bubbles. In order to avoid including bubbles as much as possible, it is preferable to arrange the bubble defoaming filter 7 close to the syringe 8. Here, the pipes 2A-2B constitute the above-described liquid path member which form the liquid path.

A preferable example of the bubble defoaming filter 7 is explained in reference to FIG. 2. A conventional bubble defoaming filter which is not shown in the drawings removes bubbles by leading the liquid material through multiple very small holes and gaps formed by making, a compressed ball of very fine metallic wires which is a rust proof metal such as stainless steel. However, with regard to a bubble defoaming filter of such a constitution, in a case of using a liquid material which has a comparatively high viscosity, a filter of such a constitution including a compressed ball of very fine wires is pressed and gradually becomes thin because of pressure caused by the liquid material passing through the bubble defoaming filter. Due to such a phenomena, very small holes and gaps inside the filter of such a constitution is further small, and there is a problem in which there is a difficulty when the liquid material is lead through the filter. Therefore, in a preferable example of the bubble defoaming filter of the present invention shown in FIG. 2, a filter constitution is applied in which multiple predetermined mesh boards on which there are uncountable very small holes are arranged substantially parallel so as to have very small intervals.

The bubble defoaming filter 7 shown in FIG. 2 provides a case portion 7A to which the pipe 2D is connected, and inside the case portion 7, multiple predetermined mesh boards 7C1-7Cn on which there are uncountable very small holes are arranged one by one so as to have equal intervals in a direction from a liquid entrance 7E connected to the pipe 2D to an outlet 7E. The mesh boards 7C1-7Cn are sandwiched and fixed by spacers 7D which are fixed on a bottom portion of the case portion 7A and are supported by sidewalls that are not shown in the drawings, hence, the mesh boards 7C1-7Cn are fixed so as to have almost no deformation even by a pressure of the liquid material S. Gaps or intervals among the mesh boards 7C1-7Cn are, for example, approximately 500 μm to 1 mm. The mesh boards 7C1-7Cn respectively have very small holes that have a diameter of, for example, approximately 2 μm. At a space K of an upper area between the liquid entrance 7B and the mesh board 7C1, a bubble gathering pipe 2X is connected in order to lead the liquid material S including more bubbles and staying at the space K to the storage tank 1.

After leading the liquid material S into the case portion 7A, first, most of bubbles having a diameter larger than approximately 2 μm are stopped by the very small holes of the mesh board 7C1, and only the liquid material including smaller bubbles than approximately 2 μm passes through the mesh board 7C1. The liquid material S including bubbles having a diameter larger than approximately 2 μm has a light specific gravity, hence, such liquid material S reaches the space portion K by being pushed by the following liquid material S. In such an operation, most of the bubbles having a diameter larger than approximately 2 μm are stopped by the mesh board 7C1, and even if some of such bubbles pass through the mesh board 7C1, the rest of the mesh boards 7C2-7Cn stop such bubbles. In addition, not only the bubbles, the multiple mesh boards can stop a gel object generated from a deteriorated resin, very small dust, and the like.

Therefore, there are almost no bubbles which have a diameter of 2 μm or larger in the liquid material S lead from the outlet 7E of the case portion 7A of the bubble defoaming filter 7 to the pipe 7E. It should be noted that the liquid material S including bubbles that have a diameter larger than 2 μm is lead into the storage tank 1 via the bubble gathering pipe 2X by using pressure inside the bubble defoaming filter 7 and is reused. It should be noted that the above-described diameter of the multiple very small holes formed on the mesh boards 7C1-7Cn is an example and can be determined based on the size of the mesh boards 7C1-7Cn, the pressure of the pressure tank 5 or the amount of liquid material S which is used per unit of time. If it is necessary to remove very small bubbles by using the bubble defoaming filter 7, it is preferable to apply the very small holes of the mesh boards 7C1-7Cn with a comparatively small diameter, and it is preferable to increase the size of the mesh boards 7C1-7Cn, that is, a number of the very small holes on the mesh boards 7C1-7Cn based on the amount of liquid material S passes through at a unit of time.

In addition, compared to a position close to the outlet 7E, it is preferable to apply a larger diameter to the very small holes on the mesh board close to the liquid entrance 7B of the bubble defoaming filter 7. For example, it is preferable that the mesh board 7C1 have multiple very small holes of a diameter of 10 μm, the mesh board 7C2 has multiple very small holes of a diameter of 8 μm, and the mesh board 7C3 has multiple very small holes of a diameter of 6 μm. In addition it is preferable that the mesh board 7Cn-1 have multiple very small holes of a diameter of 4 μm, and the mesh board 7Cn at a last stage have multiple very small holes of a diameter of 2 μm. It should be noted that it is preferable that every few sheets of the mesh boards 7C1-7Cn along a direction of leading the liquid material S, diameters of the very small holes become gradually smaller. In addition, a number of the mesh boards 7C1-7Cn can be determined based on requirements, and it is possible to apply only one mesh board if the mesh board has the very small holes of an appropriate diameter for finally removing bubbles of a desired size.

Figure 3:
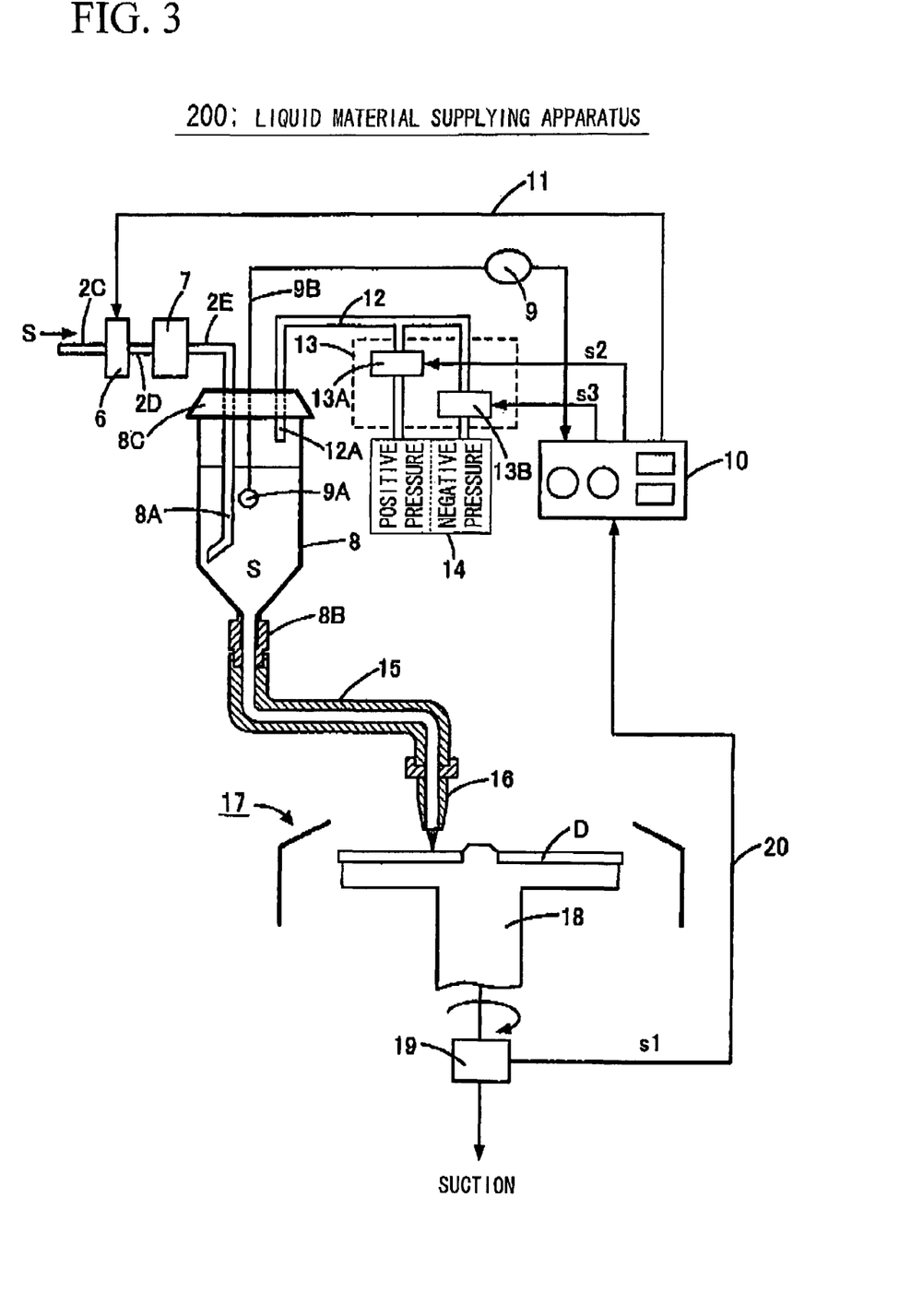
FIG. 3 is a drawing which shows a liquid material supplying apparatus 200 of an embodiment 2 of the present invention.

In order to reduce the amount of included bubbles as much as possible, it is preferable to apply a liquid path as short as possible between the outlet 7E of the case portion 7A of the bubble defoaming filter 7 to the syringe 8, hence, the bubble defoaming filter 7 is arranged close to the syringe 8 if there are no substantial problems. The pipe 2E is connected to a pipe member 8A which extends in a direction to a bottom portion of the syringe 8, and the pipe member 8A leads the liquid material S into the liquid material S inside the syringe 8 from the pipe 2E. In a preferable manner, as shown in FIG. 3, an outlet at a terminal of the pipe member 8A is arranged so as to have a small space from an inside wall of the syringe 8 without touching the inside wall, and consequently, it is possible to calmly supply the liquid material S lead along the inside wall of the syringe 8. It should be noted that it is not necessary to arrange the outlet so as to face a direction to the inside wall of the syringe 8, and it is sufficient if the outlet is sufficiently close to the inside wall so as to supply the liquid material S along the inside wall S. In accordance with such a constitution, when the liquid material S is lead into the liquid material inside the syringe 8, a surface of the liquid material S inside the syringe 8 is not disturbed, and it is possible to avoid including bubbles. In addition, it is not shown in the drawings, but the pipe 2E and the pipe member 8A preferably have the same inside diameter, that is, a diameter of the liquid path is preferably the uniform, and the liquid path is preferably smooth without gaps at a connection portion therebetween. In accordance with such a constitution, it is possible to avoid including bubbles at a connection portion between the pipe 2E and the pipe member 8A. In addition, pressure loss is small, and such a constitution is preferable to supply a fixed amount. It should be noted that the pipe member 8A constitutes a portion of the liquid path member.

Inside the syringe 8, a detecting device 9A of a liquid surface level detecting sensor 9 is provided for detecting a liquid surface of the stored liquid material S. The detection device 9A is, for example, constituted from a light emission device and a light receiving device which are not shown in the drawings and detects a surface of the liquid material S based on a difference of indices of refraction between the liquid material S and a gas inside the syringe 8. When the surface of the liquid material S inside the syringe 8 is lower than a detection or predetermined level, the liquid surface detecting sensor 9 detects changes of detected values of the detection device 9A and outputs a signal to a controller 10. After this, when the controller 10 receives the signal from the liquid surface level detecting sensor 9 that indicates the liquid surface of the liquid material S inside the syringe 8 is lower than the detection level, the controller 10 transmits a signal to the valve member 6 via a wiring 11 to issue a command to open the valve member 6 for a predetermined time. The liquid material S passes through the valve member 6 for the predetermined time, and consequently, the liquid material S from which bubbles are removed is supplied into the syringe 8. These operations are explained below in reference to FIG. 3.

On the other hand, the controller 10 rapidly increases the pressure inside the syringe 8 in order to discharge the liquid material from a nozzle 8B attached to a terminal portion of the syringe 8, and rapidly decreases the pressure inside the syringe 8 in order to stop discharging the liquid material from the nozzle 8B. This operation is explained in a second embodiment in detail. As described above, in the liquid material supplying apparatus of the first embodiment, bubble defoaming filters for removing bubbles larger than a predetermined size from the liquid material are provided on the liquid path before and after the valve member which mechanically opens/closes the liquid path through which the liquid material is transported. The liquid material just after removing bubbles is supplied into the syringe, and the liquid material is discharged or stopped from discharging by controlling the increase/decrease atmospheric pressure inside the syringe without mechanical opening/closing operations inside the syringe. Therefore, the liquid material discharged from the nozzle 8B at a terminal portion of the syringe 8 includes almost no bubbles larger than a predetermined diameter, and it is possible to reduce a possibility of including bubbles larger than the predetermined diameter in a film formed from such liquid material.

Second Embodiment

Figure 4A:
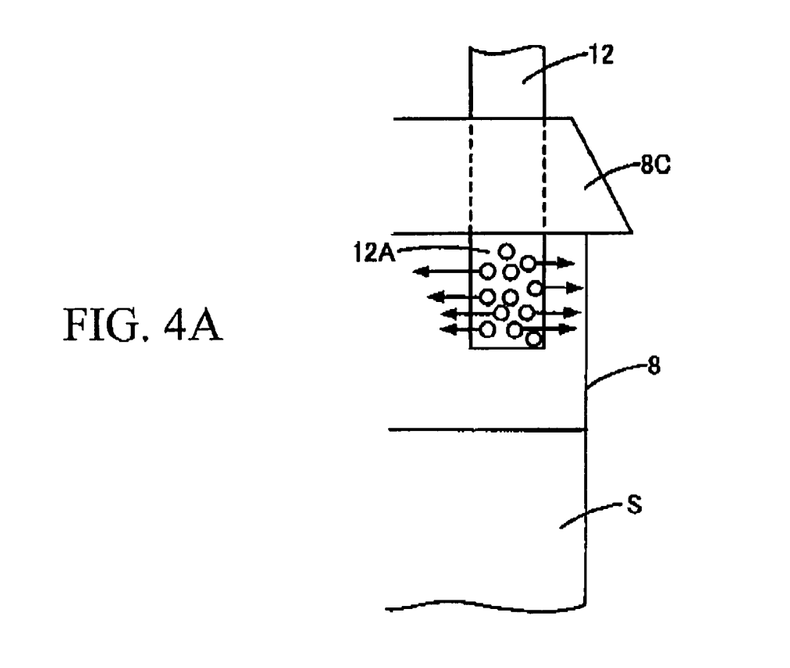
FIG. 4A is a drawing showing a preferable example of an end portion of an air tube from which a pressure is applied provided in the liquid material supplying apparatus 200 of the present invention.
Figure 4B:
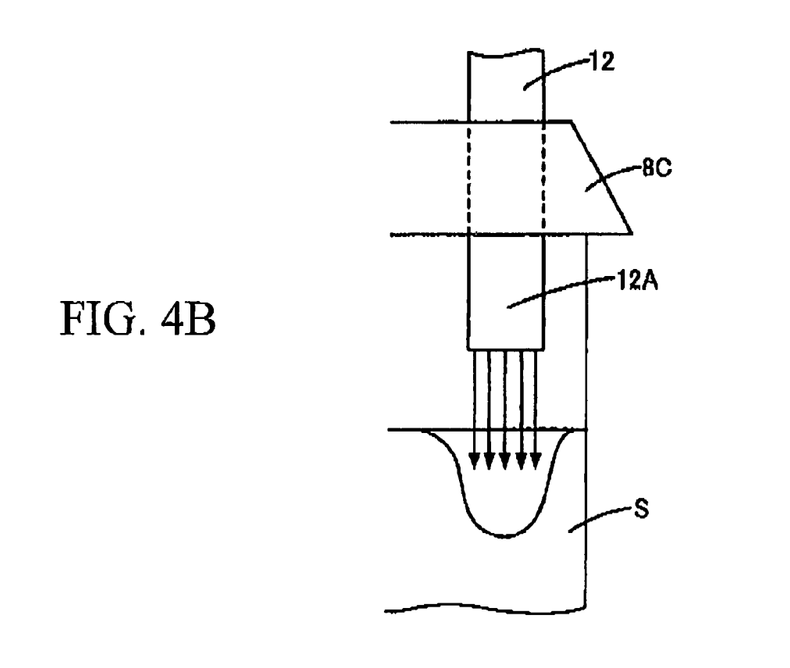
FIG. 4B is a drawing showing a preferable example of an end portion of an air tube from which a pressure is applied provided in the liquid material supplying apparatus 200 of the present invention.
Figure 5A:
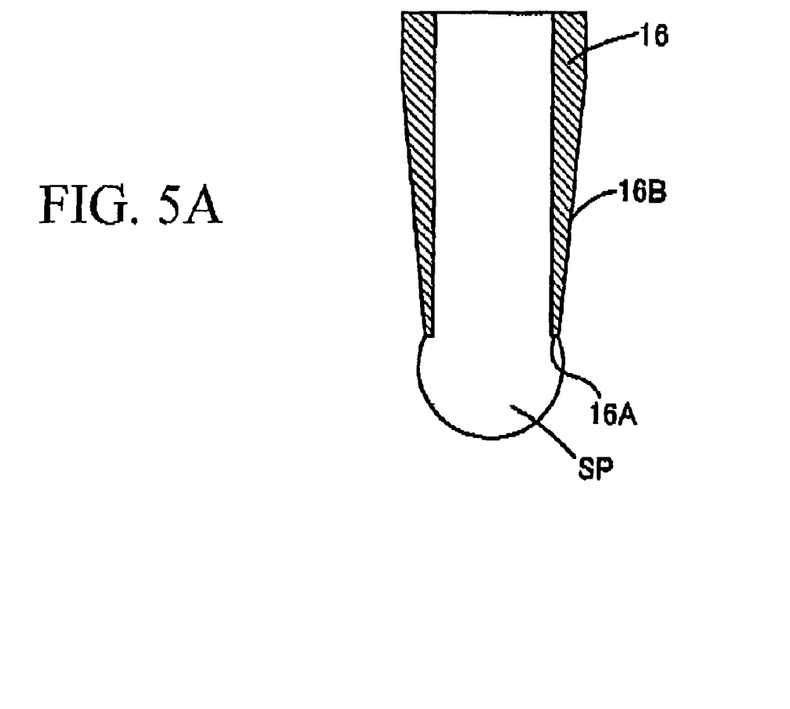
FIG. 5A is a drawing showing an example of an end portion of a discharging nozzle that is preferable fat the liquid material supplying apparatus 200 of the present invention.
Figure 5B:
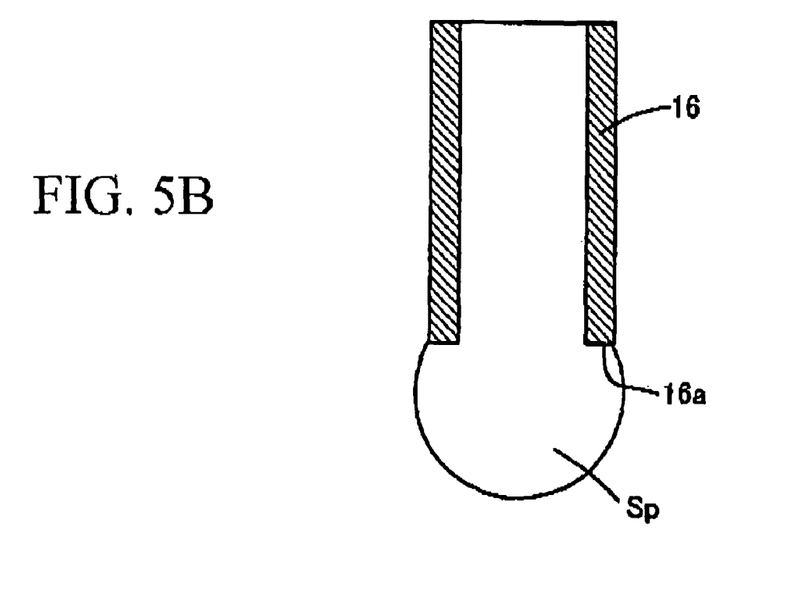
FIG. 5B is a drawing showing a generally-used end portion of a discharging nozzle that is applied to the liquid material supplying apparatus 200 of the present invention.

Next, in reference to FIGS. 3-5, a second liquid material supplying apparatus 200 is explained that is appropriate for producing the next generation optical disc. In FIGS. 3-5, the same reference numerals shown in FIGS. 1 and 2 correspond to the same names as FIGS. 1 and 2. Through the roof portion 8C of the syringe 8, other than the pipe member 8A and the wiring 9B connected to the detection device 9A of the liquid surface detecting sensor 9, an air pipe 12 for increasing/decreasing the pressure inside the syringe 8 is extended into the syringe 8. The air pipe 12 is connected to a pressure apparatus via a switching valve member 13 and supplies or ejects a compressed gas inside the syringe 8. For convenience of understanding, the switching valve member 13 is shown as two portions, a positive pressure switching valve 13A and a negative pressure switching valve 13B. The positive pressure switching valve 13A and the negative pressure switching valve 13B are never opened at the same time, and it is possible to open one of two valves when another valve is closed. A concrete constitution of the pressure apparatus 14 is not shown, but the pressure apparatus 14 is constituted from a circuit including both a positive pressure system for applying a positive pressure and a negative pressure system for applying a negative pressure. The circuit of these two systems provides a generally used regulator which is not shown in the drawings and which can adjust the pressure so as to be a desired level. A flexible pipe member 15 is connected to the nozzle 8B which is attached to a terminal portion of the syringe 8, and a discharging nozzle 16 for discharging the liquid material is attached to an end of the pipe member 15. A disc substrate D is mounted on a rotating head 18 of a spinning apparatus 17 which conducts a high speed spinning operation. It should be noted that the air pipe 12, the switching valve member 13, the pressure apparatus 14, and the like constitute a pressure applying mechanism.

Next, a liquid material supplying method and operations of the apparatus of the second embodiment are explained, and a preferable concrete example of an end portion of the discharging nozzle is explained. When one disc substrate D is mounted on the rotating head 18 by a transporting mechanism which is not shown in the drawings, the disc substrate D is stably maintained on the rotating head 18 by the suction of a vacuum apparatus which is not shown in drawings. Because there is a difference of atmospheric pressure between a free status that is before suctioning the disc substrate and a status while suctioning, a objective member detection sensor 19 such as a vacuum switch provided on a suction path is activated, and a signal s1 which indicates that the disc substrate D is mounted on the rotating head 18 to the controller 10. When the controller 10 receives the signal s1, the controller 10 immediately transmits a signal s2 to the positive pressure switching valve 13A of the switching valve 13. It is not shown in the drawings, but for example, the positive pressure switching valve 13A is an electric valve which opens a valve by applying a current to an activation coil that is not shown in the drawings when the positive pressure switching valve 13A receives the signal s2. Therefore, if the positive pressure valve 13A is opened, a predetermined compressed gas of a pressure higher than the atmospheric pressure is supplied into the syringe 8 from the pressure apparatus 14 via the air pipe 12.

Here, in reference to FIGS. 4A and 4B, a preferable example of an end portion of the air pipe 12 which extends into the syringe 8 via the roof portion 8C is explained. FIG. 4A is a drawing for explaining a terminal portion 12A of the air pipe 12 of an example of the present invention, and FIG. 4B is a drawing for explaining a generally used constitution for comparison. In order to rapidly start/stop supplying the liquid material 5, it is necessary to increase the amount of gas discharged per unit of time into the syringe 8 from the pressure applying end portion 12A which is an end portion of the air pipe 12, hence, the amount of gas is naturally increased. Therefore, as shown in FIG. 4B, in a generally used constitution, all the gas is discharged from a end surface of the pressure applying terminal portion 12A of the air pipe 12, hence, the liquid material S has a large wave because of discharging the gas, and bubbles of various diameters from large bubbles to small bubbles are included in the liquid material S. Therefore, as shown in FIG. 4A, in the present invention, most portions of the pressure applying terminal 12A of the air pipe 12 are closed, and multiple apertures H are almost uniformly formed on a cylindrical surface. There is no limitation on the apertures H. The apertures H can be various shapes such as a round hole, a square hole and a long hole. The apertures H are provided in substantially parallel with or in an obliquely upward direction compared to a surface of the liquid material S, and the compressed gas discharged from the air pipe 12 is discharged from the apertures H substantially parallel with or in an obliquely upward direction compared to the surface of the liquid material S. Therefore, the liquid material S inside the syringe is substantially unaffected by the compressed gas discharged into the syringe 8 via the air pipe 12, and there are no waves on the liquid surface of the liquid material S, hence, no bubbles are included in the liquid material S.

Back to the explanation of operations, due to the positive pressure, the liquid material S inside the syringe 8 is discharged onto the disc substrate D via the nozzle 8B, the flexible pipe member 15 and the discharging nozzle 16. A liquid path formed by the nozzle 8B, the flexible pipe member 15 and the discharging nozzle 16 is formed by inside diameters of the nozzle 8B, the flexible pipe member 15 and the discharging nozzle 16. Therefore, in the second embodiment, in order to apply a uniform diameter to the liquid path and obtain the smooth liquid path without gaps at connection portions, diameters of the nozzle 8B, the flexible pipe member 15 and the discharging nozzle 16 are the same, and consequently, a possibility in which bubbles are included in the liquid material after the syringe 8 and before discharging from the discharging nozzle 16 is very small. In accordance with such a constitution, if a bubble is included in the liquid material S discharged from the discharging nozzle 16, the size of the bubbles is very small, and there are no adverse effects on an operation of reading signals. The liquid material S is discharged on the disc substrate spinning at a low speed, or the liquid material S is discharged on the disc substrate which is not spinning while rotating the discharging nozzle 16 one time, and after this, a film of a uniform thickness is formed by extending the liquid material S while spinning the rotating head 18 at a high speed. The resin film has sufficiently excellent characteristics for being applied to next generation optical discs. Here, it is preferable to form the discharging nozzle 16 by using a metallic material and to form an electric field when discharging the liquid material S from the discharging nozzle 16 by applying a voltage of AC/DC between the discharging nozzle 16 and the rotating head 18, hence, it is possible to reduce the number of bubbles included when discharging the liquid material S onto the disc substrate D from the discharging nozzle 16, and it is possible to produce a resin film with further high quality.

The terminal portion of the discharging nozzle 16 preferably has a constitution as shown in FIG. 5A. The discharging nozzle 16 should have a certain level of strength because the discharging nozzle 16 has a connection portion with the flexible pipe member 15, hence, the discharging nozzle 16 should have a certain thickness. As shown in FIG. 5B, if the terminal portion of the discharging nozzle 16 has a uniform thickness even at a surface of the end, an outside diameter of a terminal surface 16*a* of the discharging nozzle 16 is comparatively large because of the thickness. The liquid material S discharged from the terminal portion of the discharging nozzle 16 forms a sphere when stopping the discharging operation because of the surface tension, and the diameter of the sphere depends on the outside diameter of the terminal surface of the discharging nozzle, hence, a liquid material Sp of a spherical shape on the terminal portion of the discharging nozzle 16 forms a large sphere. That is, the liquid material Sp of a spherical shape is formed while extending larger than the outside diameter of the terminal surface 16*a* of the discharging nozzle 16, hence, bubbles are included while the liquid material Sp extends on the terminal surface 16*a*. Other than such a problem, there is another problem in which, when the liquid material Sp is discharged from the terminal portion of the discharging nozzle 16, a first drop is large, and consequently, an area touching the disc substrate when discharging on the disc substrate D is large, hence, bubbles are easily included, and in addition, there is a harmful effect on the uniformity of the thickness of the film.

Therefore, the discharging nozzle 16 of the second embodiment has a tapered portion 16B in which an outside diameter of a terminal surface 16A is gradually reduced. There is no problem with the mechanical strength even when the terminal portion of the discharging nozzle is thin. It is clear that by using the tapered portion 16B, the outside diameter of the terminal surface 16A of the discharging nozzle 16 is smaller than an outside diameter of the terminal surface 16*a* of the generally used discharging nozzle 16*a* shown in FIG. 5B. Therefore, in a step of forming a sphere of the liquid material SP, an area on the terminal surface 16A on which the liquid material S extends is smaller than the case of the terminal surface 16*a*, hence, the number of bubbles involved in the liquid material SP is correspondingly reduced. In addition, a diameter of the liquid material SP in a spheric shape is the almost the same as the inside diameter of the discharging nozzle 16, hence, a first drip when starting discharging has substantially the same diameter as the following liquid material. The diameter of the liquid material SP in a spheric shape is smaller than the liquid material Sp in a spheric shape, hence, an area touches the substrate is small. Therefore, the number of involved bubbles is reduced. In addition, it is possible to prevent a drop from falling because of the weight of the liquid material, and it is possible to immediately and accurately stop discharging. Therefore, the uniformity of the thickness of the film is improved. It should be noted that, other than applying the tapered portion 16B, it is possible to provide a step or bump at a position which is separated from the terminal surface 16A of the discharging nozzle 16 for a certain distance in order to form the small outside diameter.

Back to the explanation of operations, in a normal case, when the liquid material S has been discharged for a predetermined time which is the time the disc substrate D is rotated only one revolution, the controller 10 stop transmitting the signal s2 to the positive pressure switching valve 13A and transmits the signal s3 to the negative pressure switching valve 13B. In accordance with such an operation, the positive pressure switching valve 13A is closed, the negative pressure switching valve 13B is opened, a pressure inside the syringe is immediately reduced, that is, the pressure is negative pressure, hence, a discharge of the liquid material S from the discharging nozzle 16 is stopped. In such a case, with regard to a state of pressure inside the syringe 8, the most preferable state is a state in which the liquid material S is maintained substantially flat at an end of the discharging nozzle 16. However, in addition to an improved response of stopping discharging the liquid material, it is very difficult to control the pressure in order to achieve such a state. If an operation of reducing the pressure is slow, or if the reduced amount of the pressure is small, a response of stopping discharging the liquid material is deteriorated, an excess amount of the liquid material S is discharged onto the disc substrate D, excess drops of the liquid material are used, and it is not possible to form a preferable film. On the other hand, if an operation of reducing a pressure is too strong, there is a possibility that the liquid material S will go back to a intermediate portion of the discharging nozzle 16. In the worse case, the liquid material S will go back to an intermediate portion of the flexible pipe member 15, and such a problem can be a severe factor for involving bubbles in the liquid material S. In this embodiment, for example, the positive pressure is in the range of 1.15 to 0.4 MPa, and the negative pressure is in the range of 0 to −30 kPa.

Figure 6:
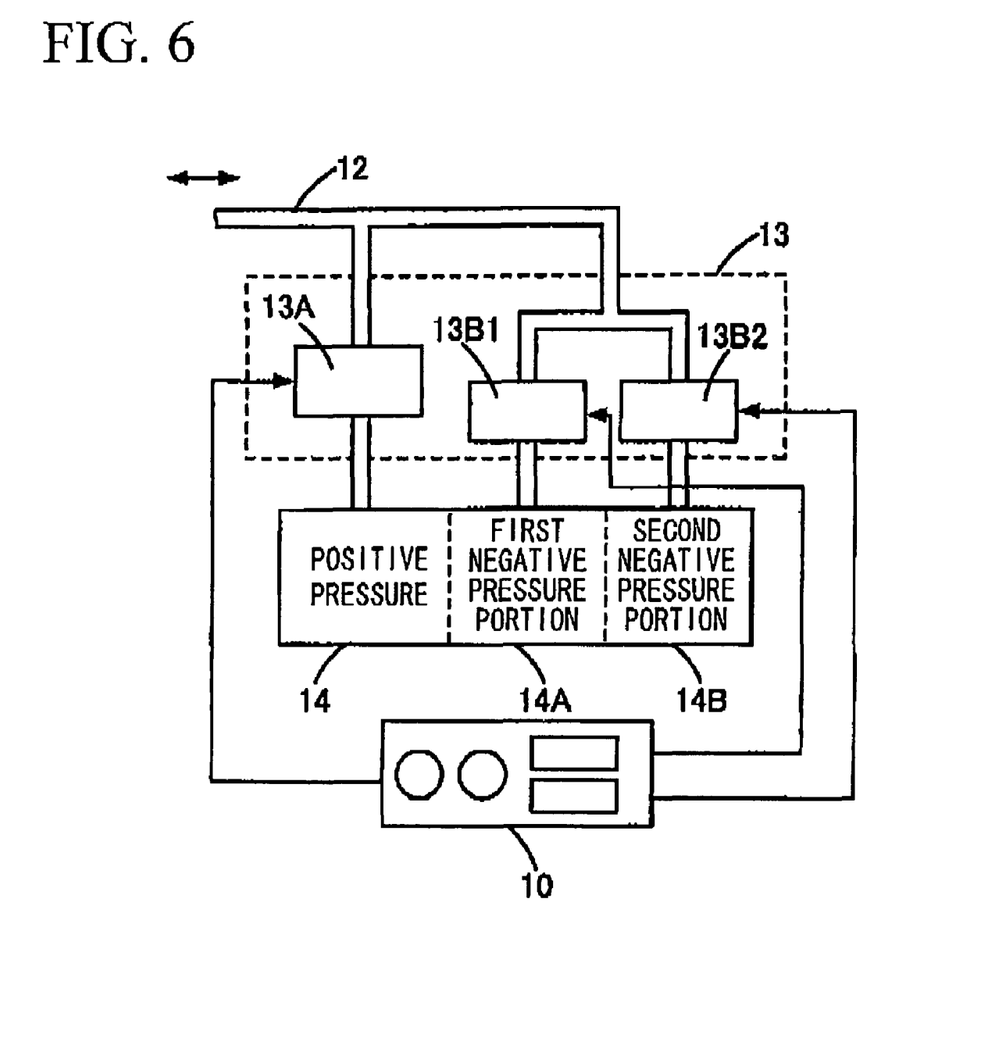
FIG. 6 is a drawing showing an example of a decompression mechanism that is preferable for the liquid material supplying apparatus 200 of the present invention.

Therefore, the second embodiment applies a preferable a method of reducing the pressure as described below. As shown in FIG. 6, the negative pressure portion of the pressure apparatus 14 is constituted from a first negative pressure portion 14A and a second negative pressure portion 14B, and the first/second negative pressure portion 14A/14B is respectively connected to the air pipe 12 via a negative pressure switching valve 13B1/13B2. The first negative pressure portion 14A applies a strong first negative pressure, and the second negative pressure portion 14B applies a second negative pressure which is weaker than the first negative pressure. The first negative pressure is a pressure substantially sufficient for suctioning or taking in the liquid material S at the end of the discharging nozzle 16 into inside of the discharging nozzle 16. The first negative pressure is, for example, in the range of −10 to −30 kPa. The second negative pressure is a pressure substantially sufficient for keeping the liquid material S at the end of the discharging nozzle 16 so as to stay at the end of the discharging nozzle 16, and is, for example, in the range of 0 to −5 kPa. When stopping discharging, in accordance with an operation sequence stored inside, the controller 10, first, opens the first negative pressure switching valve 13B1 for a predetermined short time T1 by transmitting a signal to the first negative pressure switching valve 13B1, and consequently, the liquid material S is immediately stopped from discharging from the discharging nozzle 16. After the time T1, the controller 10 cuts the signal to the first negative pressure switching valve 13B1, and at the same time, opens the second negative pressure switching valve 13B2 by transmitting a signal to the second negative pressure switching valve 13B2 in order to keep the liquid material S at the end of the discharging nozzle 16 so as to be approximately in a horizontal state compared to the end of the discharging nozzle 16. This state is maintained until the next time the positive pressure switching valve 13A is opened. In accordance with such a constitution, it is possible to switch two types of reducing operations of the pressure, it is possible to quickly stop discharging the liquid material S from the discharging nozzle 16, and at the same time, it is possible to maintain the liquid material S at the end of the discharging nozzle 16 in a preferable state.

As described above, in accordance with the liquid material supplying apparatus and method of the present invention, it is possible to apply the liquid material including a very small number of bubbles, in particular, including no bubbles larger than a predetermined size to the objective member, and it is possible to form a film including no bubbles. In the second embodiment, an example is explained in which a film is formed on a next generation optical disc. However, it should be noted that the present invention can be applied to a liquid material which has a high viscosity larger than 5000 cP, and it is possible to discharge the liquid material with a high viscosity from the discharging nozzle without including bubbles. Not only the adhesive and a liquid resin for forming a covering layer applied to a next generation optical disc, it is possible to apply the present invention to various supplying operations of an adhesive and a liquid resin used for the DVD, a photoresist material or a soldering paste used at a production step of a semiconductor, and the like. In addition, in order to detect whether or not there is an objective member such as a disc substrate, it is possible to apply other detection methods such as an optical sensor which uses light emission and reception.

It should be noted that it is possible to conduct the open and close operations of the valve member 6 with a predetermined interval in accordance with the operation sequence.

INDUSTRIAL APPLICABILITY

In accordance with the present invention, it is possible to provide a liquid material supplying apparatus which can apply the liquid material without including bubbles larger than a predetermined size and can apply the liquid material including a small number of bubbles to the objective material such as an optical disc substrate, a printed wiring board and a semiconductor substrate.

The invention claimed is:

1. A liquid material supplying apparatus comprising:
a storage tank which stores a liquid material;
a pressure tank applying a positive pressure higher than an atmospheric pressure with respect to the liquid material;
a syringe comprising a nozzle for discharging the liquid material;
a valve member which is provided between the pressure tank and the syringe and which opens/closes a liquid path of the liquid material;
a bubble defoaming filter which is provided between the syringe and the valve member and which removes bubbles from the liquid material; and
a pressure applying mechanism which selectively applies a positive pressure higher than the atmospheric pressure and a negative pressure lower than the atmospheric pressure inside the syringe in order to start/stop discharging the liquid material from the nozzle,
wherein:
the nozzle adjoins an end of the syringe,
the bubble defoaming filter comprises at least one mesh board having a small aperture arranged between a liquid entrance and an outlet of the bubble defoaming filter, and a space portion disposed at an upper portion of the bubble defoaming filter that is sandwiched between the liquid entrance and the mesh board, the space portion arranged at a first position comparatively close to the liquid entrance in a direction from the liquid entrance to the outlet,
a liquid material gathering pipe is connected to the space portion of the bubble defoaming filter to lead the gathered liquid material to the storage tank,
the outlet of the bubble defoaming filter is connected to a portion close to the syringe while a liquid path including a portion between the outlet and the syringe is formed with a uniform inside diameter.

2. A liquid material supplying apparatus according to claim 1, further comprising:
a liquid surface detecting sensor which detects a liquid surface of the liquid material inside the syringe and outputs a first detection signal; and
a first controller which inputs the first detection signal and which opens the valve member if it is detected that the liquid material inside syringe is lower than a predetermined level.

3. A liquid material supplying apparatus according to claim 2, further comprising:
a second sensor which outputs a second detection signal if the second sensor detects an objective member to which the liquid material is applied,
wherein when the first controller inputs the second signal, the first controller outputs a request signal to the pressure applying mechanism for applying the positive pressure, and
the pressure applying portion applies the positive pressure inside the syringe when the pressure applying portion inputs the request signal.

4. A liquid material supplying apparatus according to claim 2, further comprising an outlet aperture which is provided at a position lower than the predetermined level inside the syringe and from which the liquid material supplied from the pressure tank via the valve member is lead into the syringe.

5. A liquid material supplying apparatus according to claim 4, wherein the outlet aperture is arranged close to a sidewall of the syringe.

6. A liquid material supplying apparatus according to claim 1, further comprising:
   a pressure applying end portion which is arranged inside the syringe and from which a gas with a pressure is discharged when the pressure applying mechanism applies the positive pressure; and
   a small aperture which is provided at the pressure applying end portion and which faces in a substantially parallel direction or in an obliquely upward direction compared to a surface of the liquid material.

7. A liquid material supplying apparatus according to claim 1, further comprising:
   a pipe member which is flexible, has an end that is connected to the nozzle, and has the same diameter as the nozzle; and
   another nozzle which has an end connected to another end of the pipe member and has the same diameter as the nozzle.

8. A liquid material supplying apparatus according to claim 1, further comprising a terminal surface of the nozzle which has an outside diameter smaller than other portions of the terminal surface.

9. A liquid material supplying apparatus according to claim 7, further comprising a terminal surface of the another nozzle which has an outside diameter smaller than other portions of the another terminal surface.

10. A liquid material supplying apparatus according to claim 1, wherein at least two of the mesh boards are provided, and a diameter of the small hole on the mesh board close to a upstream side of the liquid material is larger than a diameter of the mesh board on a downstream side of the liquid material.

11. A liquid material supplying apparatus according to claim 1, wherein the pressure applying mechanism comprises:
   a first negative pressure portion applying a first negative pressure to the syringe;
   a second negative pressure portion applying a second negative pressure smaller than the first negative pressure to the syringe; and
   a second controller which controls the first negative pressure portion to apply the first negative pressure when stopping discharge of the liquid material, and after a predetermined time, controls both the first negative pressure portion to stop applying the first negative pressure and the second negative pressure portion to apply the second negative pressure.

12. A liquid material supplying apparatus comprising:
a pressure tank applying a positive pressure higher than an atmospheric pressure with respect to a liquid material;
a syringe comprising a nozzle for discharging the liquid material;
a valve member which is provided between the pressure tank and the syringe and which opens/closes a liquid path of the liquid material;
a bubble defoaming filter which is provided between the syringe and the valve member and which removes bubbles from the liquid material; and
a pressure applying mechanism which selectively applies a positive pressure higher than the atmospheric pressure and a negative pressure lower than the atmospheric pressure inside the syringe in order to start/stop discharging the liquid material from the nozzle,
wherein the pressure applying mechanism comprises:
   a first negative pressure portion applying a first negative pressure to the syringe;
   a second negative pressure portion applying a second negative pressure smaller than the first negative pressure to the syringe; and
   a second controller which controls the first negative pressure portion to apply the first negative pressure when stopping discharge of the liquid material, and after a predetermined time, controls both the first negative pressure portion to stop applying the first negative pressure and the second negative pressure portion to apply the second negative pressure.

* * * * *